(No Model.) 2 Sheets—Sheet 1.
L. H. BROOME & J. BUCKINGHAM.
TILE.
No. 599,117. Patented Feb. 15, 1898.
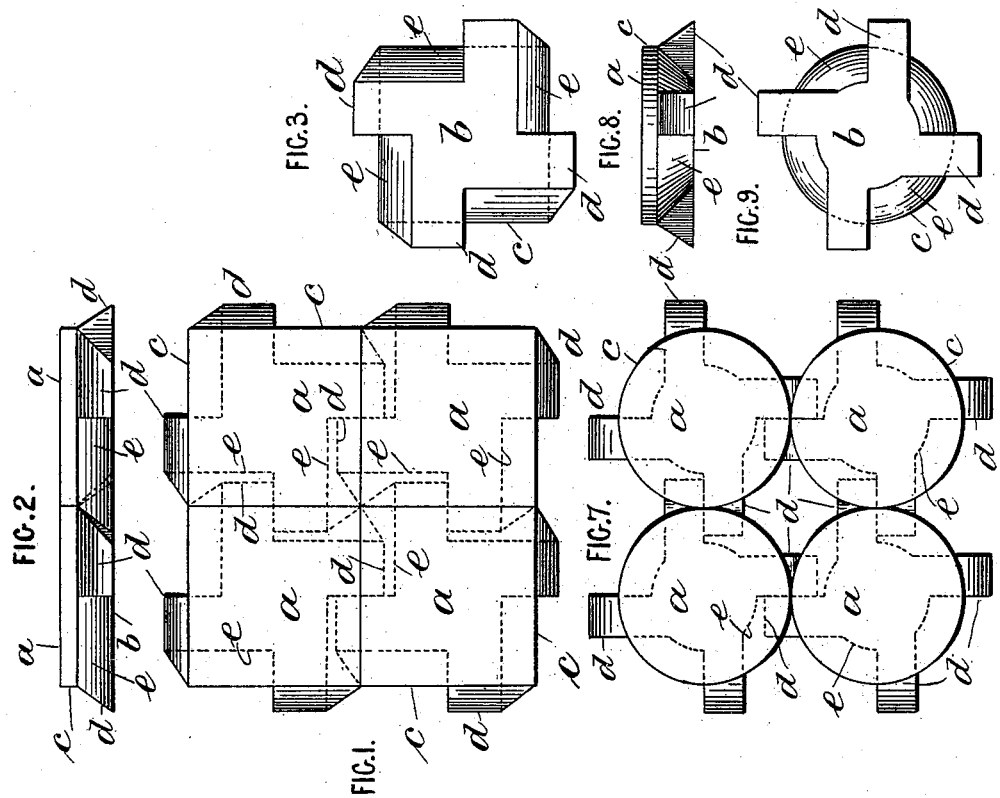
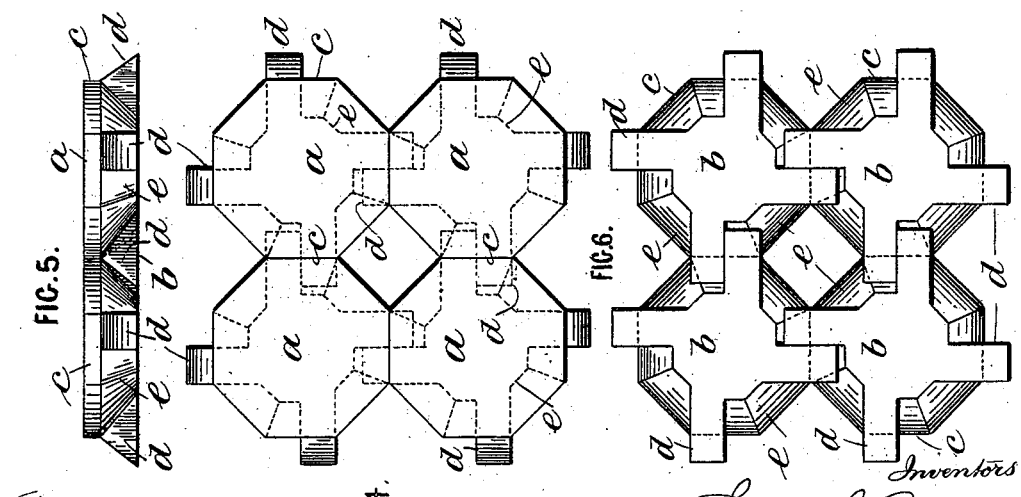

(No Model.) 2 Sheets—Sheet 2.
L. H. BROOME & J. BUCKINGHAM.
TILE.
No. 599,117. Patented Feb. 15, 1898.
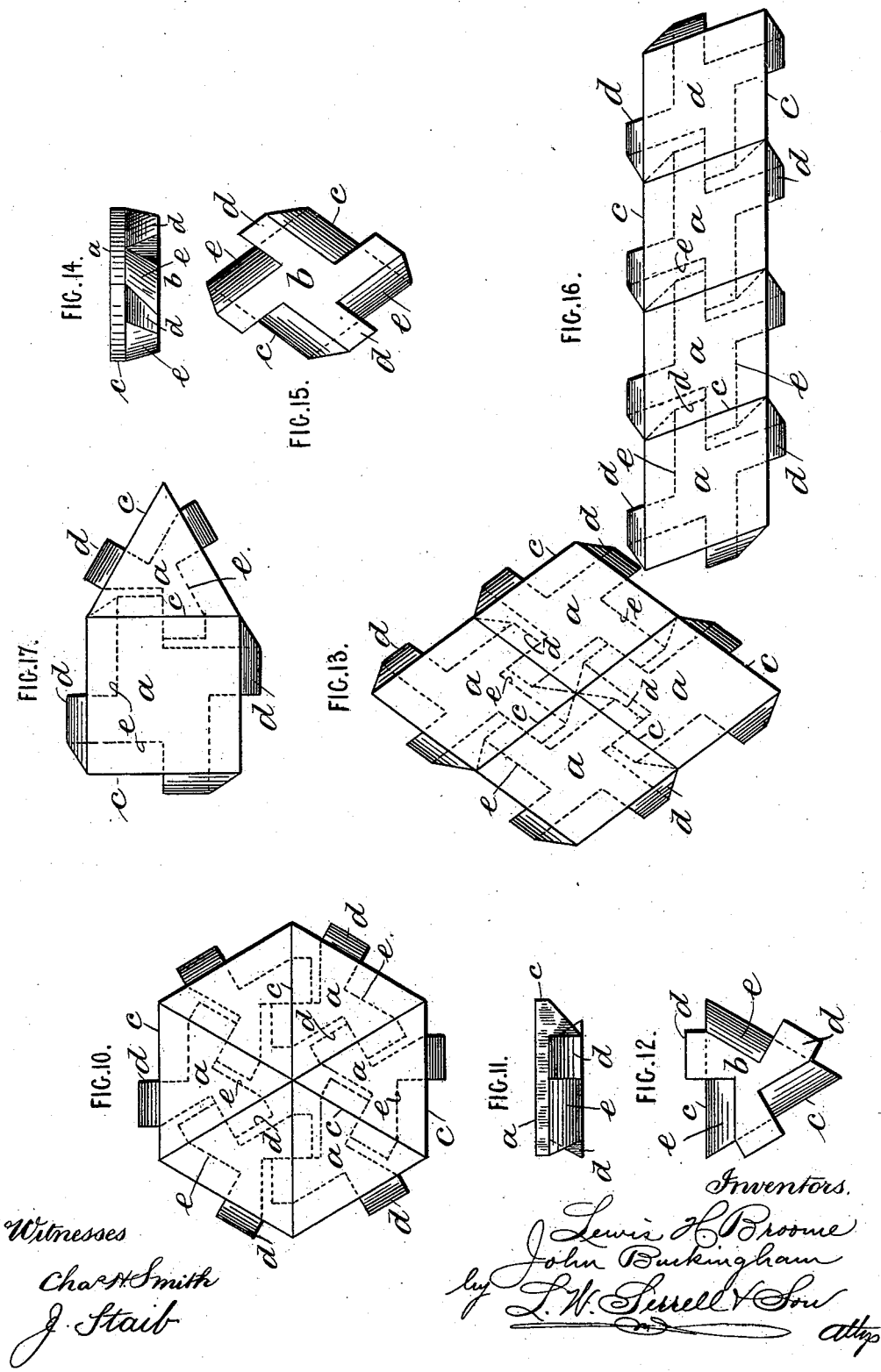
Witnesses
Chas H Smith
J. Staib
Inventors,
Lewis H Broome
John Buckingham
by L. W. Serrell & Son
Attys

UNITED STATES PATENT OFFICE.

LEWIS H. BROOME, OF JERSEY CITY, NEW JERSEY, AND JOHN BUCKINGHAM, OF NEW YORK, N. Y.

TILE.

SPECIFICATION forming part of Letters Patent No. 599,117, dated February 15, 1898.

Application filed May 24, 1897. Serial No. 637,857. (No model.)

*To all whom it may concern:*

Be it known that we, LEWIS H. BROOME, of Jersey City, in the county of Hudson and State of New Jersey, and JOHN BUCKINGHAM, of New York, in the county and State of New York, citizens of the United States, have invented a new and useful Improvement in Tiles, of which the following is a specification.

Our invention relates to tiles of various facial configurations forming a flooring or wall surface when laid in cement. These tiles as heretofore constructed have consisted of parallel back and front surfaces and plain sides at right angles thereto. These tiles are very liable to loosen from their bed of cement in use and to become broken; and the object of our invention is to overcome this difficulty by providing tiles with locking edges.

In carrying out our invention we preferably employ tiles each having three or more straight edges or sides; but any desired shape of tile is adapted to our improvement. We divide the edges, boundary, or periphery of the tiles and cause feet to project at approximately equidistant places therefrom and provide adjoining undercut portions to receive the projecting feet of the adjacent tiles. If the tile is a three or four sided figure, then approximately one half of each edge projects as a foot and the other approximate half is undercut, the projections and undercut portions alternating around the tile. In all cases we prefer to retain about one-third in depth of the edges plain and at right angles with the upper surface of the tile, the projections and undercut portions occupying the remaining portion at the under side of the tile.

In relation to the vertical plane of the edges of the tiles the surfaces of the undercut portions are preferably at a greater angle than the surfaces of the projecting feet, so that when the parts are brought together there are numerous interstices into which the cement foundation or backing is forced to assist in holding the tiles thereto and locking them together, so that no single tile can become loosened.

In the drawings, Figure 1 is a plan, and Fig. 2 an edge view, of a group of square tiles made according to our invention; and Fig. 3 is an inverted plan of one of the said tiles. Fig. 4 is a plan, Fig. 5 an edge view, and Fig. 6 an inverted plan, of a group of octagonal tiles made according to our invention. Fig. 7 is a plan of a group of circular tiles; and Fig. 8 an edge view, and Fig. 9 an inverted plan, of one of said tiles. Fig. 10 is a plan of a group of equilateral-triangle tiles; and Fig. 11 is an edge view, and Fig. 12 an inverted plan, of one of said tiles. Fig. 13 is a plan of a group of lozenge-shaped tiles; and Fig. 14 is an edge view, and Fig. 15 an inverted plan, of one of said tiles. Fig. 16 is a plan of a group of parallelogram tiles, and Fig. 17 is a plan showing a combination of tiles of different shapes.

The tiles are made with an upper surface $a$ and under surface $b$ parallel to each other, and a portion of each edge $c$ is plain and at right angles to the upper surface $a$. This portion $c$ represents about one-third of the edge adjacent to the upper surface $a$, while the projecting feet $d$ and undercut portions $e$ represent about two-thirds of the thickness of the tile adjacent to the under surface $b$. With reference to the vertical plane of the sides of the tiles, the inclined surface of the projections $d$ represents an angle of about thirty-five degrees, and the angle of the inclined surface of the undercut portions is greater, or about forty-five degrees. This provides in the joining up of the tiles for interstices between the respective angles into which the cement foundation or backing in which the tiles are laid is pressed up and not only forms a continuation of the backing-cement, but, as it were, projections thereof, which adhere to the surfaces of the feet and undercut portions to more compactly bind the tiles together and to the foundation or backing and at the same time lock them in place.

In the form of tiles represented in Figs. 1, 2, 3, 13, 14, 15, and 16 each of the four edges of the tile is provided with a projecting foot and an undercut portion, and these alternate around the tile.

In the form of tile shown in Figs. 10, 11, and 12 each of the three edges is provided with a projecting foot and an undercut portion, the line of division between the foot and undercut portion being at the center of each of the three edges.

In the form of tile shown in Figs. 4, 5, and

6—namely, the octagon form—four of the edges are provided with the projecting feet and undercut portions, said four edges of the adjacent tiles coming together and locking when the tiles are laid, the open space between the four tiles being filled up in laying the tile by small pieces or a small block in any desired manner.

In the form of tile shown in Figs. 7, 8, and 9—namely, a tile with a circular surface—projecting feet and undercut portions are shown at right angles to one another, the line of division between the respective projecting feet and undercut portions being upon lines through the center of the tile and at right angles to each other, so that the parts interlock and are proportioned in a similar manner to the projections and undercut portions of the tiles shown in Figs. 4, 5, and 6. The space between the group of tiles, as shown in Fig. 7, is to be filled when the tiles are laid up by small pieces or a small block in any desired manner.

Fig. 17 shows a square tile and an equilateral-triangle tile having a side of equal length with the side of the square as brought together. This illustrates that various combinations may be formed between tiles of different shapes so long as two of their sides agree in length.

Our improvement is adapted to tiles of various facial configurations, and the same forms a very convenient, substantial, and secure means for connecting the tiles as laid to form a floor or wall surface.

We claim as our invention—

1. A tile having an edge that is substantially perpendicular to the face, and feet below and projecting beyond such edge, and undercut portions for receiving the projecting feet of the adjoining tiles, substantially as specified.

2. A tile having flat edges that are substantially perpendicular to the surface and feet projecting beyond said edges and adjacent undercut portions for receiving the projecting feet of the adjoining tiles, substantially as specified.

3. A tile having inclined feet projecting at each side and adjoining undercut portions to receive the feet of the adjacent tiles, the angle of the inclined surface of the undercut portions being greater than the angle of the inclined surface of the feet, substantially as and for the purposes set forth.

4. A tile having a plain edge adjacent to its outer face extending about one-third of the depth of the tile and having feet projecting at each side and adjoining undercut portions to receive the feet of the adjacent tiles, said feet and undercut portions occupying the thickness of the tile between the plain side and the under surface, substantially as and for the purposes set forth.

5. A tile having a plain edge adjacent to its outer face extending about one-third of the depth of the tile and having feet projecting at each side and adjoining undercut portions to receive the feet of the adjacent tiles, said feet and undercut portions extending the thickness of the tile between the plain edge and the under surface, the said feet and undercut portions having inclined surfaces that start from the lower edge of the plain edge and extend to the plane of the under surface of the tile, substantially as and for the purposes set forth.

Signed by us this 18th day of May, 1897.

L. H. BROOME.
JOHN BUCKINGHAM.

Witnesses:
GEO. T. PINCKNEY,
HAROLD SERRELL.